US012652331B1

(12) United States Patent
Gangadhara et al.

(10) Patent No.: US 12,652,331 B1
(45) Date of Patent: Jun. 9, 2026

(54) DYNAMIC DATA SIGNAL COLLECTION TO PREVENT TELEMETRY SPOOFING IN A BOT DETECTION SYSTEM

(71) Applicant: Akamai Technologies, Inc., Cambridge, MA (US)

(72) Inventors: Vikas Chikmagalur Gangadhara, Celina, TX (US); Gabrio Barbieri, Alajuela (CR); Vineeth Koyikkal Puthenveedu Aravindan, Frisco, TX (US); Oren Mashal, Tel Aviv (IL)

(73) Assignee: Akamai Technologies, Inc., Cambridge, MA (US)

( * ) Notice: Subject to any disclaimer, the term of this patent is extended or adjusted under 35 U.S.C. 154(b) by 40 days.

(21) Appl. No.: 18/971,097

(22) Filed: Dec. 6, 2024

(51) Int. Cl.
| | |
|---|---|
| *G06F 15/173* | (2006.01) |
| *G06F 9/455* | (2018.01) |
| *H04L 67/025* | (2022.01) |

(52) U.S. Cl.
CPC ........ *H04L 67/025* (2013.01); *G06F 9/45512* (2013.01)

(58) Field of Classification Search
None
See application file for complete search history.

(56) References Cited

U.S. PATENT DOCUMENTS

| | | | |
|---|---|---|---|
| 7,111,057 B1 | 9/2006 | Sherman et al. | |
| 8,806,646 B1 | 8/2014 | Daswani et al. | |
| 9,448,776 B1 * | 9/2016 | Sankaran | G06F 16/957 |

| | | | |
|---|---|---|---|
| 10,587,629 B1 | 3/2020 | Kurupati et al. | |
| 10,686,818 B2 | 6/2020 | Kurupati | |
| 10,708,281 B1 | 7/2020 | Modalavalasa | |
| 11,245,722 B1 | 2/2022 | Senecal et al. | |
| 11,368,483 B1 | 6/2022 | Senecal et al. | |
| 11,374,945 B1 | 6/2022 | Senecal et al. | |
| 11,870,804 B2 | 1/2024 | Kurupati | |
| 12,047,465 B1 * | 7/2024 | Giovangrandi | H04L 67/535 |
| 12,164,644 B2 | 12/2024 | Hod et al. | |
| 12,255,916 B2 | 3/2025 | Costa et al. | |
| 12,316,672 B2 | 5/2025 | Senecal et al. | |
| 12,341,808 B1 | 6/2025 | Thomas et al. | |

(Continued)

FOREIGN PATENT DOCUMENTS

| | | |
|---|---|---|
| KR | 10-2022-0144666 A | 10/2022 |
| KR | 2024-1 B1 | 1/2024 |

OTHER PUBLICATIONS

Bot Manager, Akamai Product Brief, published by Akamai Technologies, Inc., Oct. 2023.

(Continued)

*Primary Examiner* — Phuoc H Nguyen
(74) *Attorney, Agent, or Firm* — David H. Judson

(57) ABSTRACT

The subject matter herein provides a platform and mechanism to enable dynamic control over data signal collection telemetry in a bot detection-based access control system executing, for example, in associated with a multi-tenant shared network infrastructure. The approach herein leverages the ability of a native SDK running in a mobile device application to launch and use a webview that controls the data collection process. The techniques make it harder for bad actors to send spoofed telemetry from their mobile devices to an overlay network edge platform having an associated bot detection system back-end.

19 Claims, 11 Drawing Sheets

(56) References Cited

U.S. PATENT DOCUMENTS

| | | | |
|---|---|---|---|
| 2012/0311614 A1 * | 12/2012 | DeAnna | H04L 67/10 |
| | | | 719/328 |
| 2017/0011379 A1 * | 1/2017 | Kouru | G06F 40/174 |
| 2018/0167412 A1 | 6/2018 | Barrett et al. | |
| 2021/0226987 A1 | 7/2021 | Summers et al. | |
| 2021/0329091 A1 * | 10/2021 | Yellin | H04L 67/5681 |
| 2022/0191241 A1 | 6/2022 | Vera-Schockner | |
| 2023/0199023 A1 | 6/2023 | Kurupati | |
| 2023/0336571 A1 | 10/2023 | Costa et al. | |

OTHER PUBLICATIONS

PCT/US2025/058603, International Search Report and Written Opinion, mailed Apr. 15, 2026, 10 pages.

Songqing Chen et al., Security and Privacy in Communication Networks, 15th EAI International Conference, SecureComm 2019 Orlando, FL, USA, Oct. 23, 2019, pp. 28-61, 225, 279, 451-467, and Figure 4.

Community, How to Use OpenTelemetry & JavaScript Together: A Tutorial, Oct. 20, 2023 https://www.influxdata.com/blog/how-use-opentelemetry-javascript-tutorial/, pp. 1-7.

Morel Madmon, Bot Detection Based on Input Method Analysis, Jan. 21, 2023 https://transmitsecurity.com/blog/bot-detection-based-on-input-method-analysis, pp. 1-5.

* cited by examiner

EDGE
400

ORIGIN
402

END USER
404

1
2
3
4

1
4

3  4

406
DETECTION
ENGINE

1. CLIENT REQUEST A FORM,
   EDGE INJECT JS TAG

2. CLIENT LOAD JS

3. BEHAVIOR DATA IS
   COLLECTED ON THE CLIENT
   AND SENT TO ENGINE

4. CLIENT REQUEST THE
   PROTECTED ENDPOINT,
   EDGE RETRIEVE THE THREAT
   SCORE FROM ENGINE

500

```
// Import the class
        import com.akamai.botmanCYFMonitor;
        public class MainActivity extends Activity {
                @Override
                protected void onCreate ( Bundle savedInstanceState) {
                        // Initialize Akamai BMP SDK
                        CYFMonitor. initialize( getApplication( ) ) ;
                }
        }
```

```
protected void loginAction ( ) {
    // Get the BMP sensor data
    String sensorData = CYFMonitor. getSensorData( ) ;
    // Initialize HttpURLConnection
    URL url = new URL( "https://bmpapi.akamai.com/samples/v1/login") ;
    HttpURLConnection urlConnection = ( HttpURLConnection) url. openConnection( );
    // Set the sensor data header
    urlConnection. setRequestProperty( "X-acf-sensor-data", sensorData) ;
    // set the POST body and send the request
    }
}
```

```
// Set the sensor data header
        urlConnection. setRequestProperty(
                "X-acf-sensor-data", CYFMonitor. getSensorData( ) ) ;
```

FIG. 6

| | METHOD NAME | WEEK 1 | WEEK 2 | WEEK 3 | WEEK 4 | WEEK 5 | WEEK 6 | WEEK 7 | WEEK 8 | WEEK 9 | WEEK 10 | WEEK 11 | WEEK 12 |
|---|---|---|---|---|---|---|---|---|---|---|---|---|---|
| 1 | startTime | X | | | | | | | | | | | |
| 2 | systemVersion | | X | | | | | | | | | | |
| 3 | model | X | | X | | | | | X | | | | |
| 4 | deviceHardwareType | | X | X | X | | | | | | | | |
| 5 | appIdentifier | X | X | X | X | X | | | | | | | |
| 6 | deviceId | | X | | X | | X | | | | | | |
| 7 | cpuTypeAndSybType | X | | X | | X | | X | | | | | |
| 8 | kernalOsRelease | | X | | X | | X | | X | | | | |
| 9 | kernalOsVersion | | | | | X | | | | | | | |
| 10 | deviceModel | | | | | | X | X | X | | | X | |
| 11 | hardwareModel | | | | | | | | | X | | | X |
| 12 | hardwareMemSize | | | | | | | X | | | X | | |
| 13 | cpuNumber | | | | | | | | | X | | | X |

FIG. 10

DYNAMIC DATA SIGNAL COLLECTION TO PREVENT TELEMETRY SPOOFING IN A BOT DETECTION SYSTEM

BACKGROUND

This application relates generally to protecting websites and mobile applications (apps) from automated attacks by scripts or bots.

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

It is known to provide a JavaScript-based technology to fingerprint clients and collect telemetry to evaluate end user behavior and to differentiate bots from humans. A commercial service of this type is available from Akamai Technologies, Inc. of Cambridge, Massachusetts. Among other uses, this technology is useful to protect transactional workflows including, without limitation, login, checkout, search, gift card validation, coupons/rebates processing, etc., and that are regularly the target of fraud activity using botnets.

While bot detection systems such as described above provide significant advantages, detection of automated attacks or bots is difficult because they are constantly evolving and adapting to bypass detection algorithms. Detections based upon telemetry are also vulnerable to improved synthetic telemetry from bots.

There remains a need to provide advanced techniques to ensure against telemetry spoofing in a network operating environment that provides bot detection.

SUMMARY

The techniques herein provide a platform and mechanism to add or modify signal collection telemetry, making it harder for bad actors to send spoofed telemetry from their mobile devices to an overlay network edge platform having an associated bot detection system back-end.

In one aspect, the data collection and bot detection techniques herein enable an application executing on a client-side device to access a protected endpoint executing on a remote node, such as an edge server of an overlay network. The client-side device executes a code library (e.g., a Software Development Kit (SDK)) in association with the application. Data collection then proceeds as follows. In particular, and within an operating context initiated by the application, a webview is initiated by the code library. The webview typically is implemented as an invisible frameless component within the application, and it allows background execution of a script inside the application. Based in part on signaling (such as device information) collected by the SDK, the webview issues a request to the edge server to fetch a data collection script. The edge server obtains the script, together with a set of signals to be executed in the webview for active data collection. The script provided by the edge server may be selected from a set of scripts that are available, or the one set of signals (and their respective ordering) may be selected from a set of signals. Thus, either the script or the signaling identified in the script (or both) are dynamic in that they are determined at the time of the webview initiating the request. The webview receives and executes the script, thereby obtaining signals data. The webview then passes the collected signals data back to the SDK, which combines that data with other sensor data collected by the SDK itself. The SDK also packages the combined data set into an encrypted telemetry stream that is then returned to the edge server, where it may be processed directly or passed to other back-end systems for bot detection. Based on the bot detection, access to the protected endpoint is permitted, or a given mitigation action is taken to prevent such access.

The foregoing has outlined some of the more pertinent features of the disclosed subject matter. These features should be construed to be merely illustrative. Many other beneficial results can be attained by applying the disclosed subject matter in a different manner or by modifying the subject matter as will be described

BRIEF DESCRIPTION OF DRAWINGS

For a more complete understanding of the subject matter and the advantages thereof, reference is now made to the following descriptions taken in conjunction with the accompanying drawings, in which:

FIG. 5 depicts representative code by which a CDN customer imports code that adds a getSensorData( ) method to their application via an SDK integration process;

FIG. 6 depicts a representative header for use in transporting telemetry;

FIG. 10 depicts an example of how a given version of a script may be configured to include different sets of function calls so as to provision different data collection activity on the client-side;

DETAILED DESCRIPTION

Operating Environment

Figure 1:
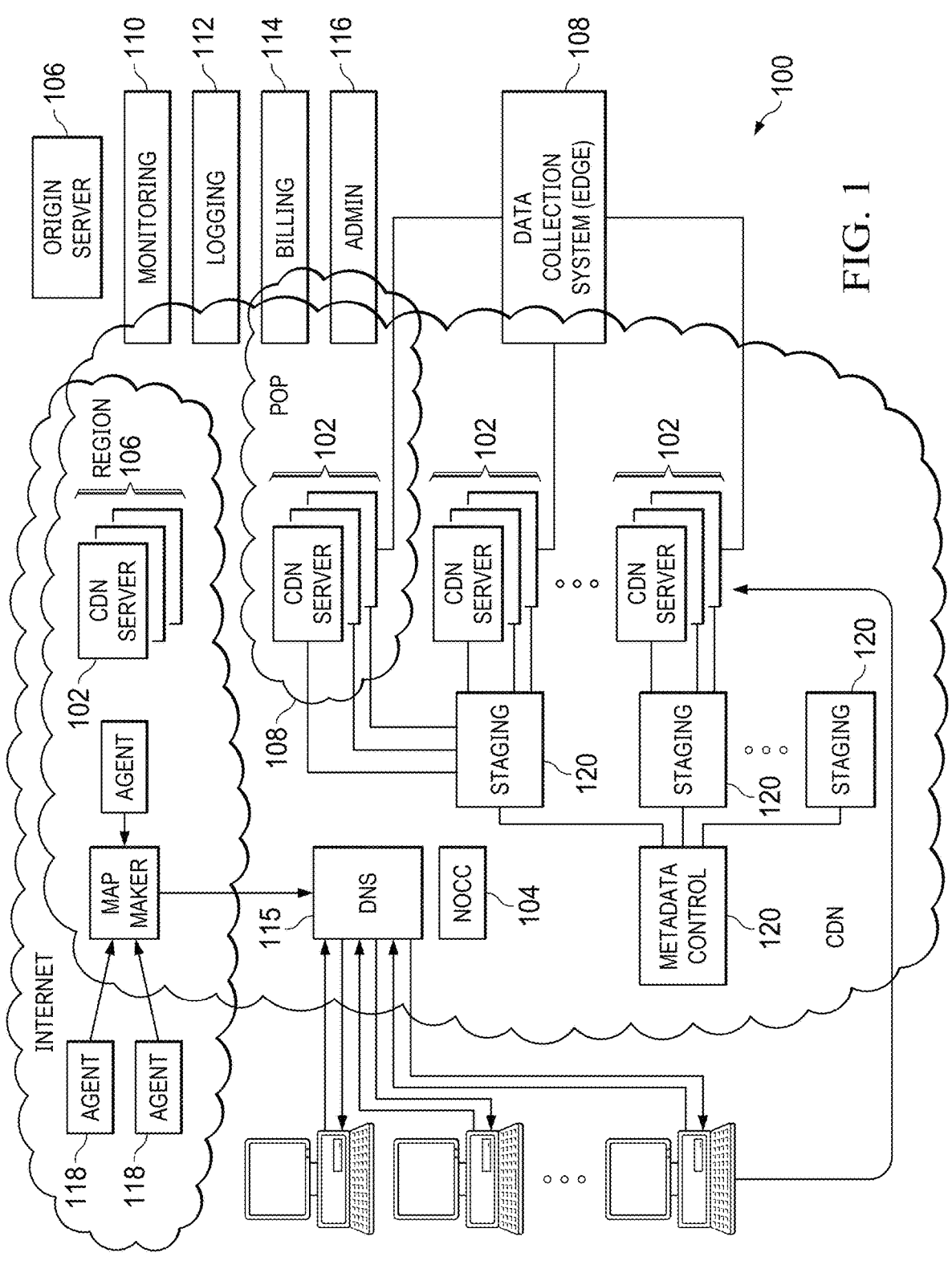
FIG. 1 is a distributed computer system in which the techniques of this disclosure may be practiced.

In a known system, such as shown in FIG. 1, a distributed computer system 100 is configured as a content delivery network (CDN) and is assumed to have a set of machines 102*a-n* distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
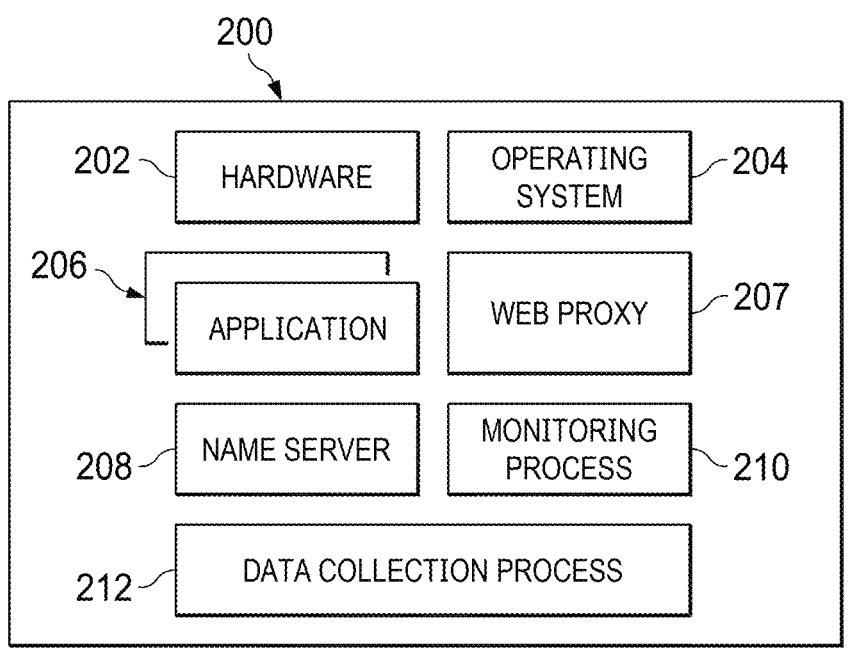
FIG. 2 depicts a representative machine architecture that supports and executes an edge server at which the bot detection of this disclosure may be initiated.

As illustrated in FIG. 2, a given machine 200 comprises commodity hardware 202 running an operating system kernel (such as Linux or variant) 204 that supports one or more applications 206*a-n*. To facilitate content delivery services, for example, given machines typically run a set of applications, such as an HTTP proxy 207 (sometimes referred to as a "global host" process), a name server 208, a local monitoring process 210, a distributed data collection process 212, and the like.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may provide secure content delivery among a client browser, edge server and customer origin server. Secure content delivery enforces SSL- or TLS-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Thus, and as used herein, an "edge server" refers to a CDN (overlay network) edge machine. For a given customer, the CDN service provider may allow a TCP connection to originate from a client (e.g., an end user browser, or mobile app) and connect to an edge machine representing the customer on a virtual IP address (VIP) assigned to the customer, or a general VIP that allows for discovery of the intended customer. For purposes of this disclosure, it is assumed that this edge machine does not have the customer's private key or the customer's certificate.

Figure 3:
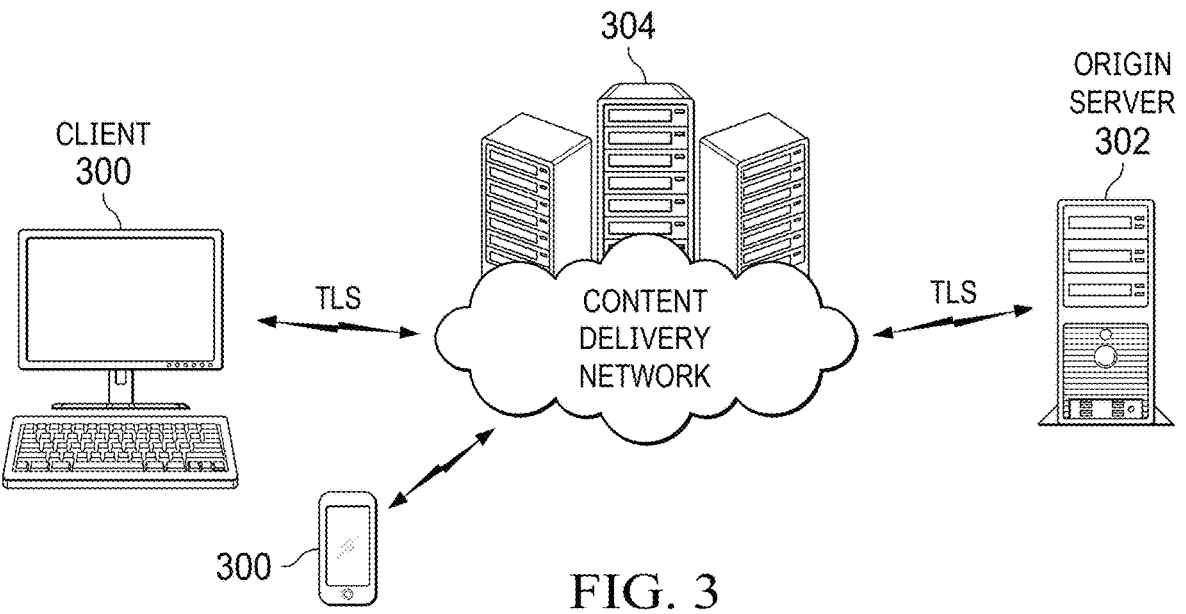
FIG. 3 depicts a typical end user interaction with an edge server of a content delivery network (CDN), the CDN providing accelerated delivery of content published by a content provider.

As illustrated in FIG. 3, in the typical interaction scenario, an end user client browser or mobile app 300 is associated with a customer origin server (or "origin") 302 via the intermediary of an overlay network edge machine server instance 304 (sometimes referred to as an "edge server"). The terms "origin" or "edge" are not intended to be limiting.

As further background, HTTP requests are expected to come with certain headers, for example the Host header, which may indicate which web server is being addressed, or the User-agent, which identifies what type of system (browser, device) is making the request so that the web server hosting the content can response with content adapted to the system that requests it. Different browsers (Edge, Firefox, Safari, Chrome, Opera) send more or less the same set of headers, but the order in which headers are sent varies from one browser to the next or the HTTP protocol version. The header sent also depends on the method of the (POST vs. GET). and the type (XHR request vs. text/html requests). The order of the HTTP header and the protocol version constitutes a header fingerprint.

It is known to perform client request anomaly detection by evaluating a request header signature and looking for anomalies typically seen with bots. If the total anomaly score reaches a predefined threshold, an action rule will trigger. Some of these rules are designed to evaluate the header order of requests coming from client claiming to be Firefox, Chrome, Opera, Safari, Internet Explorer or Microsoft Edge.

Basic bots and botnets can be detected relatively easily using such detection techniques. These more simplistic bots usually give themselves away because there are enough anomalies in the header signature, or their behavior is atypical of a regular user. That said, the system may produce false negatives with respect to highly distributed botnets that "hide" behind a proxy, send request at a low rate, or perhaps have little to no anomalies in their header signatures. To detect these more sophisticated botnets, which sometimes execute on a headless browser (e.g., CasperJS, PhantomJS, Selenium, NodeJS), more advanced detection techniques may be used. JavaScript injection techniques are widely used in the industry to help detect these more advanced botnets. In particular, a bot that shows little anomalies in the header signature and behaves "like a regular user" may actually not fully support JavaScript. For a bot that fully supports JavaScript, it is desirable to inject code that helps collect specific characteristics (a fingerprint) of the client that when evaluated, helps detect them.

Figure 4:
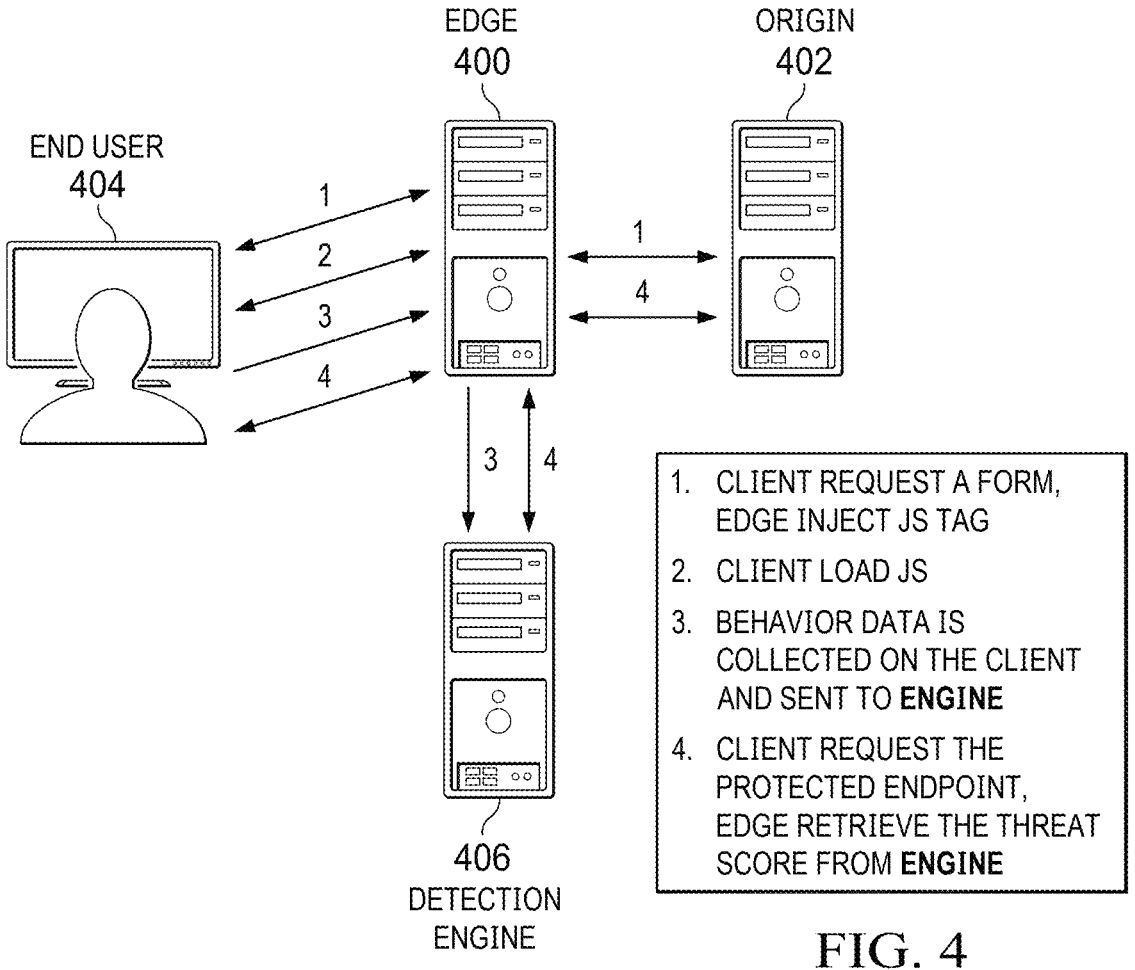
FIG. 4 depicts a bot detection service operating in association with the CDN.

Bot detection using information collected through JavaScript (JS) may proceed as follows, and as depicted in FIG. 4. At step (1), the JS is dynamically injected at the edge server 400 on the relevant pages (text/html) that the edge retrieves from the origin server 402. At step (2), the client 404 loads the JS, executes it, and then sends the data collected (e.g., a JS fingerprint) back to the edge server, typically asynchronously. At step (3), the edge server 400 intercepts and evaluates the JS fingerprint, looking for specific anomalies typically seen when coming from an automated system (script or bot, etc.). At step (4), each anomaly is given a score and, if the fingerprint total anomaly (threat) score goes beyond a certain threshold, the client is classified as a bot. Preferably, the result of the fingerprint evaluation is recorded in a session cookie and evaluated with each subsequent request.

Thus, and as depicted in FIG. 4, JavaScript-based technology collects a lightweight fingerprint and perhaps other behavioral data from the client. Typically, the data is collected asynchronously and sent to a bot detection engine 406. On a protected request (e.g. a TLS-secured HTTP POST login), the edge server 400 obtains the client classification from the bot detection engine 406 and applies it on the edge.

Several methods may be used to detect bots using the fingerprint including, without limitation, anomaly detection, dynamic rate limiting, and blacklisting.

Anomaly detection is based on the principle that good browsers (such as Chrome, Firefox, Safari, and the like) have a few valid combinations of given fingerprints for each browser version. The "known" or "correct" combinations are learned a-priori. This can be done by analyzing prior human traffic and building a table of valid combinations (user agent and associated fingerprint possibilities). A bot script masquerading its user-agent as one of the well-known browsers is then caught by checking for the existence of the user-agent and the given fingerprint in the "known/correct" table.

Dynamic rate limiting is based on the principle that the system keeps tracks of the received fingerprints and then rate limits given fingerprints. Bot Attacks can be blocked in this way, as the given fingerprint will rapidly exceed the allowed rate threshold.

Blacklisting is based on the principle that the fingerprints of malicious bot tools can be collected and stored in a database/file (also known as a blacklist file). When a fingerprint is part of this blacklist file, it is then blocked.

All of the above techniques can be modulated with other signals to produce higher accuracy.

Summarizing, it is known to provide a script-based technology to fingerprint clients and collect telemetry to evaluate the user behavior and differentiate bots from humans. Among other uses, this technology is useful to protect transactional workflows including, without limitation, login, checkout, search, gift card validation, coupons/rebates processing, etc., and that are regularly the target of fraud activity using botnets. The technology may also be used to protect web sites against scraping activities. Further details regarding the above techniques can be found, for example, in commonly-owned U.S. Pat. Nos. 11,245,722, 11,368,483 and 11,374,945, the disclosures of which are incorporated herein by reference.

Dynamic Signal Control for Mobile SDK to Prevent Telemetry Spoofing

With the above as background, the techniques of this disclosure are now described. In general, the approach herein makes it harder for attackers to generate fake telemetry that could complicate or disrupt CDN bot detection and, in particular, by enabling dynamic control over the data collection process that occurs at an end user client-side implementation (namely, a customer application that executes in an end user client device). The solution is achieved without the need for any customer-provided application updates or direct involvement by the CDN itself.

As used herein, "SDK" refers to "Software Development Kit," which typically is a collection of software used for developing applications for a specific device or operating system. In this context of this disclosure, a "mobile SDK" refers to a CDN customer's implementation of a CDN SDK within (or in association with) a customer application that, as noted above, is configured to execute in the end user client. As pertinent to this disclosure, the mobile SDK is used as part of a CDN bot management and detection system and, in particular, to facilitate the collection and providing of telemetry from a client device running the application to the CDN system bot detection back-end to facilitate the bot determination. FIG. 4 depicts the basic CDN architecture on which the mobile SDK is provided.

As explained above, a bot management and detection system is designed to detect automated traffic generated by bots. Known commercial solutions, such as Akamai® Bot Manager, use several methods to detect and categorize bots. For customer applications that run in mobile devices, the CDN provides its customer with the mobile SDK (typically as a library), which is associated with the customer application that serves as a front-end to a protected endpoint that is supported in the CDN edge. Natively, the mobile SDK is configured to operate in association with the customer application, and it operates on "signals." As used here, a signal refers to a discrete or continuous set of data that represents specific events, states, or inputs. In the SDK, signals typically refer to data points, events, or metrics collected from a mobile application and that provides insight into user interactions, or system behavior. The signals comprise a set of data that is collected on the client, and a particular set of those signals can be sent back to the edge in a configurable order. This data set is sometimes referred to herein as "telemetry." As used herein, a Telemetry Order Identifier (TOID) refers to a particular order of the signals generated and sent to the edge. Distinct TOIDs thus identify different signal orderings.

Generalizing, a bot detection system as implemented by the CDN edge platform is configured to differentiate bots from humans by relying on human behavior data. This user behavior is collected based on defined "signals" and collected data is provided to the edge as telemetry. As noted, collected data can include parameters such as key events, screen activity triggered by user interaction, and more. To reduce false positives, preferably certain types of endpoints, such as login portals, signup pages, and the like, are configured with this solution. To facilitate this process, a mobile SDK (a library that a CDN customer attaches to its mobile application (app)) gathers information about the device and the user operating it. This information typically includes device characteristics, device orientation, data, touch events, and more. That information is reported back to the bot detection system back-end, typically using an HTTP header dedicated for this purpose. To provision the mobile SDK for data collection, the customer integrates a function call to receive this sensor data and provides a way to attach the collected data to HTTP requests. To this end, FIG. 5 depicts representative code 500 by which the CDN customer imports code that adds a getSensorData( ) method to their application via an SDK integration process. FIG. 6 depicts a representative header (referring to here as an X-ACF header) 600 that is sent to the CDN prior to any application requests and that is used to provide the telemetry. The collected telemetry can also be used to develop the signals that strive to detect malicious activity within the context of a user's mobile device (that executes the customer's mobile app and the mobile SDK).

Figure 7:
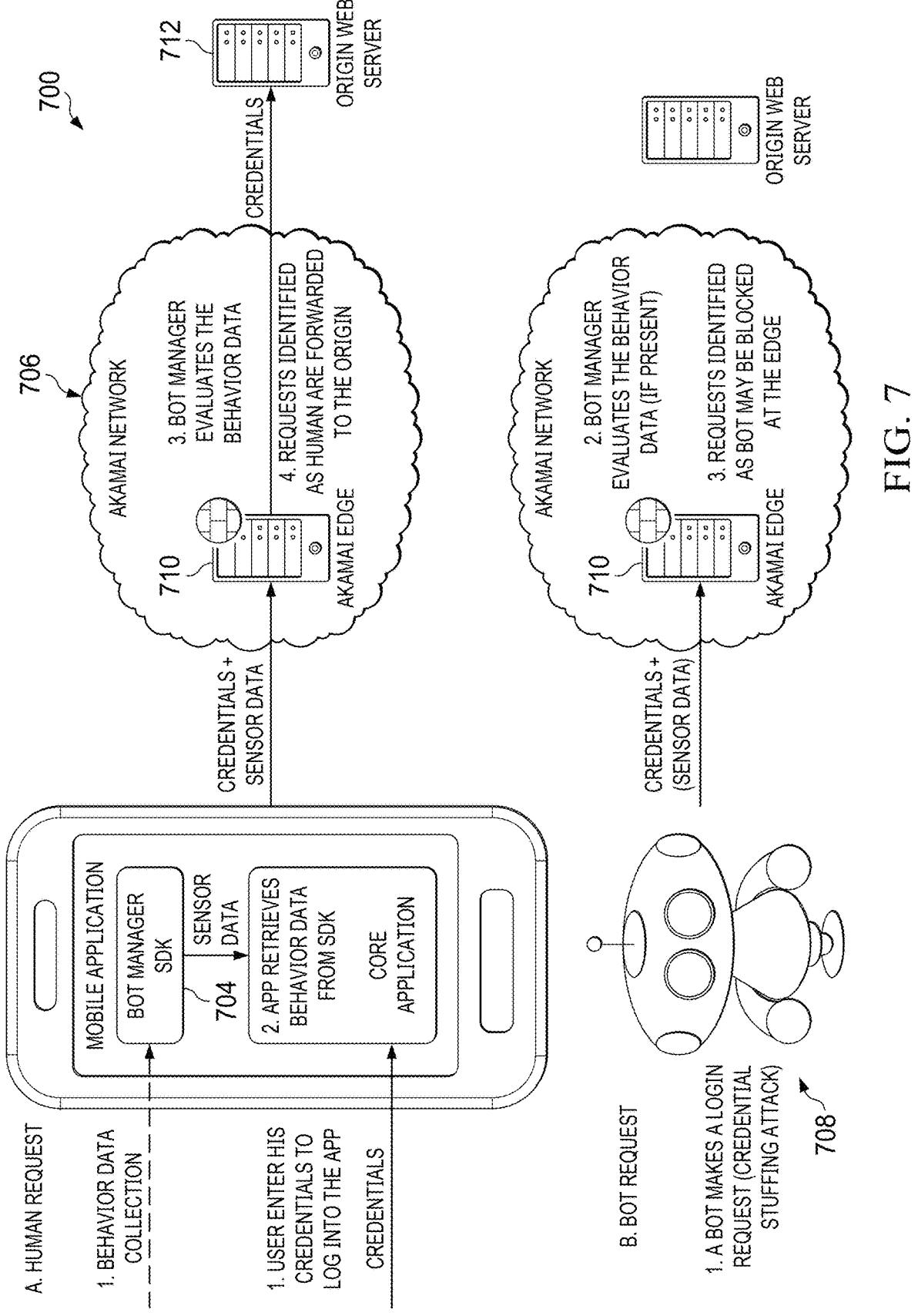
FIG. 7 depicts interactions between one of: a human being, and a bot, and the edge platform during a request workflow.

As further background, FIG. 7 depicts representative request interactions between, on the one hand, a legitimate mobile device 700 executing a core application 702 and configured with the mobile SDK 704, and the CDN back-end infrastructure 706, and on the other hand, a request originating from a bot 708. In the "human request" operation, it is assumed that the end user's mobile device has the mobile SDK 704 configured in advance of making a request to a protected endpoint that is available from the CDN edge 710. As seen in this workflow, at step (1) the user of the mobile device enters his or her credentials to log into the core application 702. At step (2), the core application 702 retrieves sensor (behavior) data that has been collected by the mobile SDK 704. The credentials and sensor data to the edge 710, typically an edge server. At step (3), a bot management detection service configured on or in association with the edge 710 evaluates the behavior data. This operation was described in FIG. 4. At step (4), and having identified the request as being associated with a human being and not a bot, the credentials are forward to an origin web server 712 for authentication. Once the credentials are verified, the end user's access to the protected endpoint proceeds. On the other hand, the bot request workflow at bottom involves step (1), wherein the bot 708 make a login request, e.g., via a credential stuffing attack. The bot credentials and any collected sensor data are forwarded to the edge server. At step (2), the edge 710 and associated bot detector evaluates any behavior data. At step (3), and having determined that the request is likely associated with a bot and not a human being, the request is blocked or otherwise mitigated.

According to this disclosure, a CDN customer that has a digital property (e.g., a native app endpoint) being protected by a bot management detection system is provided with a mechanism that enables "dynamic signal control" over the telemetry (signals data) collected by the device. The mechanism leverages the mobile SDK and, in particular, the capability of that library to initialize and execute a "webview" capability. Typically, a webview is a web browser that is embedded in an app. It is implemented as a modular unit of software that encapsulates specific functionality. The webview enables the use of web content within apps. The Android™ system WebView is based on Google Chrome™; the Apple® WebView for its devices is based on Safari. Microsoft® Edge™ runs WebView2. Generalizing, a webview is a component within a native app that allows display or execution of web content inside the app. As will be seen, the approach herein uses the native SDK webview to enable a fully dynamic scripting capability by which the data collection process on the client is selectively configured to control signals data collection and delivery of telemetry to the CDN back-end for bot detection. This solution is implemented without requiring an update to the SDK itself (or a new SDK). The approach herein enables telemetry information (namely, the types of signals collected) to be changed flexibly and dynamically. As a shorthand, the approach provides an SDK-based Dynamic Signal Control (DSC) functionality that enables the addition or modification of signal collection telemetry (the "sensor data" in the FIG. 5 workflow), making it harder for bad actors to send spoofed telemetry.

Figure 8:
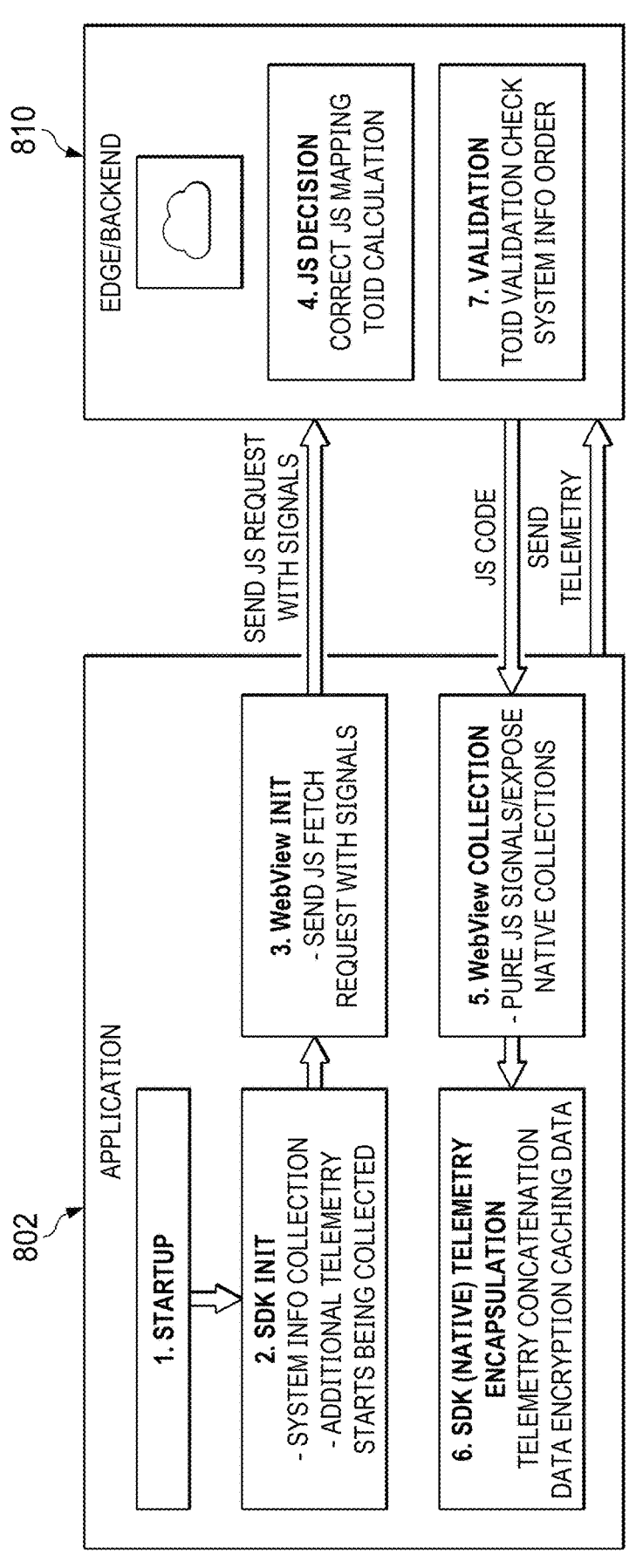
FIG. 8 depicts a first embodiment of the dynamic signal control technique of this disclosure.

FIG. 8 depicts a simplified embodiment. As depicted, an application 802 executing on a client device is configured to interoperate with an edge/back-end 810. At step (1), the application 802 starts up. At step (2), the application initializes the SDK. This begins collection of system information, as well as additional telemetry (e.g., user behavior data). At this point in the workflow, the application has not received any data collection script from the edge. At step (3), the SDK initializes a webview, which then sends a request to fetch a data collection script (typically, a JavaScript (JS)). The JS request also identifies a set of signals, typically device information signals. The "signals" are selected (by the native SDK) from a configurable set of device information signals. According to a feature of this disclosure, the set of signals actually identified in a given script generated at the edge/ back-end differs from the device information signals passed along with the JS request; in particular, according to this disclosure the set of signals sent back with the script dynamically varies, e.g., daily, weekly or otherwise, such that it is not possible for an attacker to "know" what actual signals are being designated for collection in the script. Thus, initially the SDK initiated webview sends the JS request with the device information signals to the edge/back-end 810. At step (4), a JS decision is made based at least in part on a signal mapping of the set of device information signals identified with the JS request. The resulting JS code, which includes or identifies a new set of signals that will be acted upon by the webview, in effect is customized (for this particular request-response flow), and forwarded back to the webview. The JavaScript runs on the invisible (frameless) webview to collect signals mapped through the SDK. To this end, and at step (5), the script initiates collection of the JS-specified signals to be evaluated. The webview JavaScript then passes the signals collected during the script run back to the native SDK. In the SDK, and at step (6), these webview-collected signals are merged with any SDK collected signals. Preferably, the SDK also provides additional processing, such as encapsulation, data encryption, and caching. The resulting encrypted telemetry (based on the dynamic set of control signals specified in the script, and optionally the data collected by the native SDK) is then returned to the edge/back-end for the human/bot evaluation. This is step (7). Based on this validation, either the access to the protected endpoint is allowed (because the request is determined to associated with a human) or a mitigation action is taken (because the request is determined to be associated with a bot).

Figure 9:
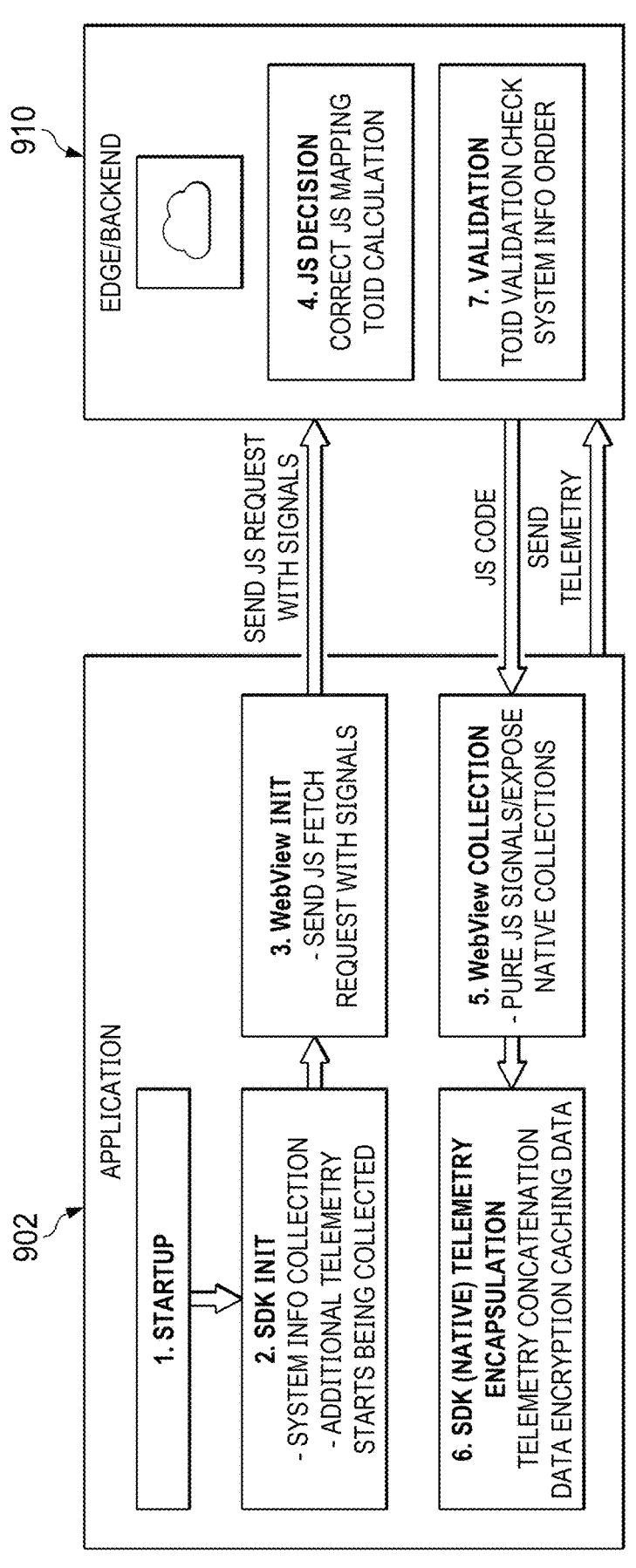
FIG. 9 depicts a second embodiment of the control technique of this disclosure.

In the above-described process, preferably the script file drives the signal collection and order, and the edge platform (e.g., an edge server) is responsible to generate the TOID. According to a further aspect, preferably a Dynamic Telemetry Order (DTO) is enforced during the above-described script generation process. In this aspect, a TOID is computed at the edge at the script fetch time. Based on the TOID and day of week, the customer's end user mobile application receives one of a given number of JS files that have been configured (e.g., per week) on the edge platform. This TOID, which may be generated at the edge server that is servicing the client request, is sent (by the edge server) to an edge back-end along with collected sensor data for bot detection. This workflow is depicted in FIG. 9, which is similar to the workflow described above in FIG. 8 but also includes the additional processing at the edge. In particular, the application 902 executing on a client device interoperates with the edge/back-end 910. At step (1), the application 902 starts up. At step (2), the application initializes the SDK. At step (3), the SDK initializes the webview, which then sends the request to fetch a data collection script. As noted above, typically the JS request a set of device information signals. At step (4), a JS decision is made based at least in part on a signal mapping of the set of device information signals identified with the JS request. Step (4) also calculates the TOID. The resulting JS code is forwarded back to the webview. At step (5), the script initiates collection of the JS-specified signals to be evaluated. As previously described, the webview JavaScript then passes the signals collected during the script run back to the native SDK, and these webview-collected signals are merged with any SDK collected signals at step (6). After the telemetry is returned to the edge platform, the validation operation is carried out at step (7). Typically, the logic to deobfuscate telemetry sensor data runs in the back-end, but it may also run on the edge. As depicted, validation also includes validating the TOID (which is forwarded to the back-end from the edge server), as well as the ordering of the collected signals data.

Without intending to be limiting, the following provides additional details about the script generation process that occurs at the edge platform, typically on the edge server that is processing the request (although this is not a requirement). In this aspect, and for every SDK JS version, preferably there are a number (e.g., 52) variants of the JS that are generated at a build time. These variants are named 00 to 51, and a given variant is automatically served by the edge server based on the week of the year. Preferably, each JS variant includes unique SDK function calls, and the result (the signals data) obtained from SDK function calls is sent as part of a sensor data field that is validated at the back-end. Preferably, a unique SDK calling function also is implemented to ensure a unique SDK calling function is used by every variant. The back-end is configured to validate the SDK data generated by the variant JS functions. Relatedly, FIG. 10 depicts a portion of a data table 1000 that lists a set of available methods in the first column, and each "week" of the year in the follow-on columns. Each method is identified in a row, and an X mark indicates a particular week in which the particular method is included in the identification of the collection signal(s) that are provided with the script.

Figure 11:
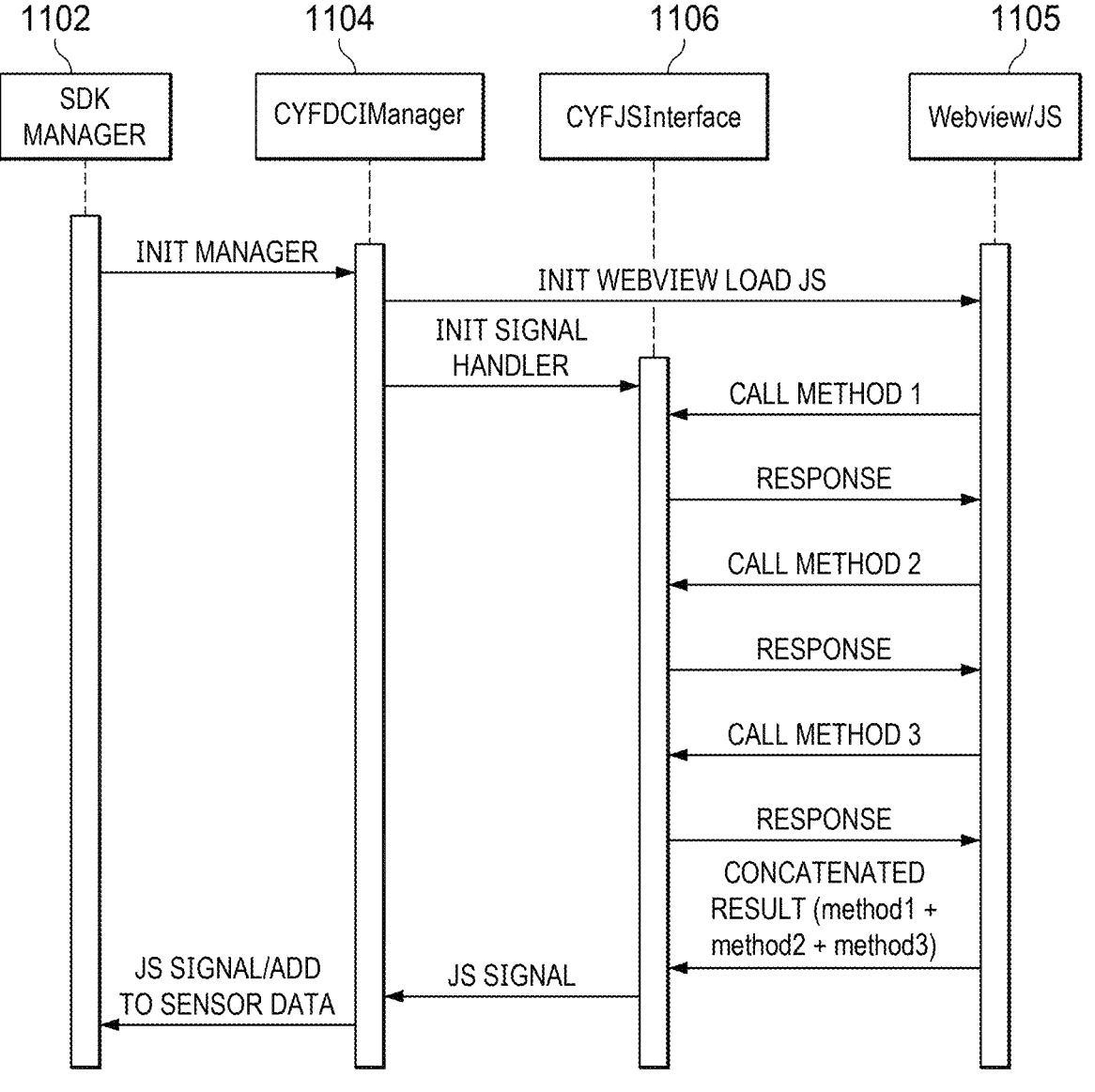
FIG. 11 depicts an interaction between the SDK and an associated webview during data collection.

FIG. 11 depicts an interaction workflow between the SDK and the webview to facilitate the data collection. To this end, the SDK executes an SDK manager 1102 having an associated SDK manager interface 1104. The webview 1105 has an associated signal handler interface 1106. In this workflow, the SDK manager 1102 initializes the interface 1104, which in turn initializes the webview 1105 and loads the JS fetched from the edge. The interface also initializes the signal handler interface 1106. As the script is executed by the webview 1105, the webview calls one or more methods identified in the script for data collection. The signal handler interface executes each method and returns a response (the collected data) to the webview 1105. After all methods are called and executed, the webview concatenates the results and passes the collected data back to the signal handler interface 1106. This data represents the JS signals data, which the signal handler interface 1106 then returns to the SDK manager interface 1104. The SDK manager interface then returns the collected data back to the SDK manager 1102, where the data is added to any sensor data that the SDK manager has collected. The resulting set of aggregate data is then processed and returned to the edge back-end as the telemetry that is used for the bot detection.

Figure 12:
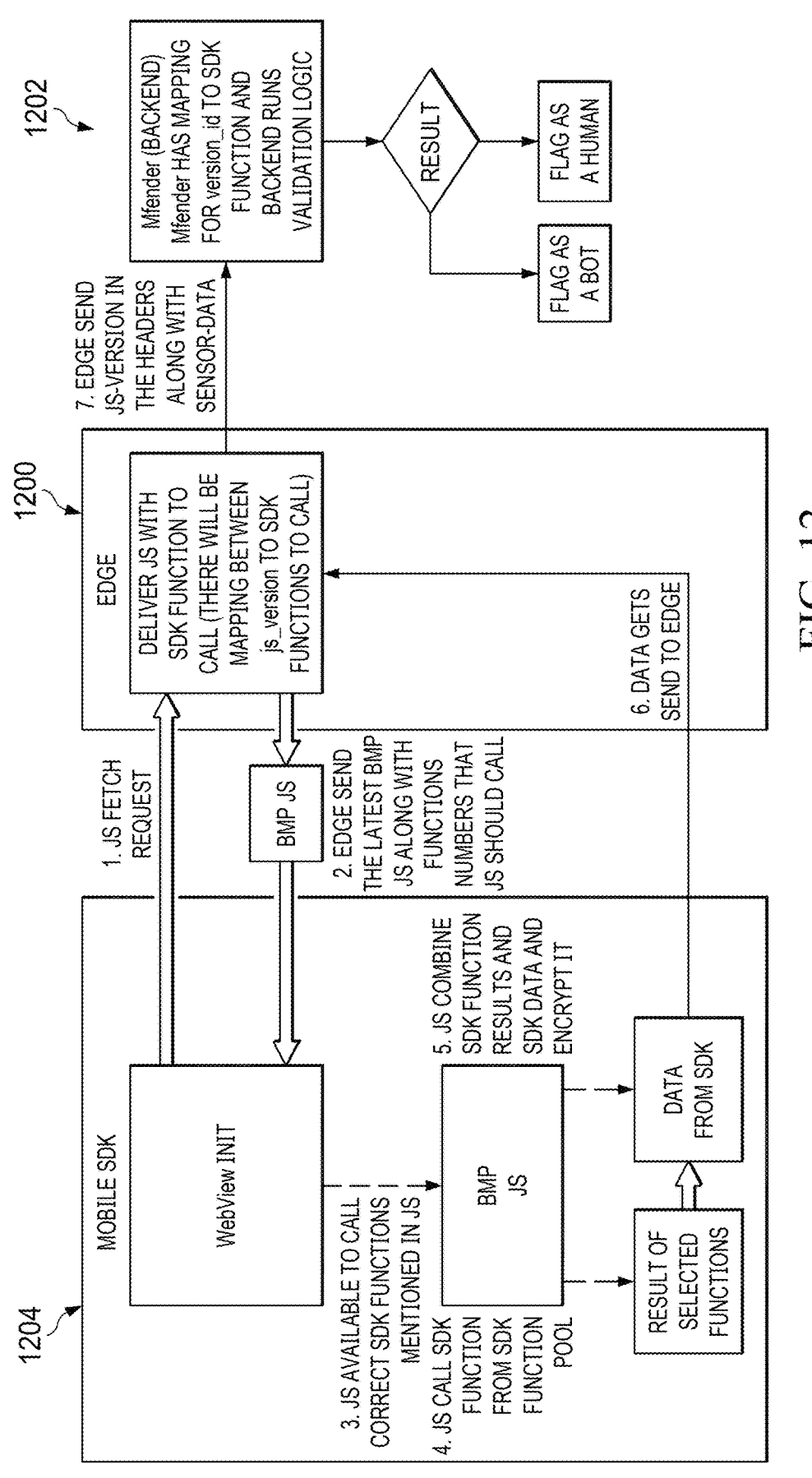
FIG. 12 depicts an end-to-end workflow of the technique of this disclosure in a preferred embodiment.

FIG. 12 depicts a further detailed representation of the end-to-end workflow in a preferred embodiment. As depicted, the edge platform includes an edge 1200 (typically an edge server), and a back-end bot detection system 1202. The mobile SDK 1204 executing on the end user mobile device is also shown, and the workflow assumes that the native SDK has initiated the webview. At step (1), the webview makes the JS fetch request to the edge server 1202. The edge server responds by identifying/generating the JS version with an SDK function to call. Preferably, and as described above, there is a mapping between js_version to SDK functions to call. At step (2), edge server 1202 returns the JS along with function numbers that the script should call to facilitate the webview-based data collection. As noted above, it is a feature of this disclosure that the set of function numbers (as well as the script itself) that are variable, thus providing the dynamic signal control that makes it effectively impossible for an attacker to spoof the data collection process. At step (3), webview executes the script and, at step (4) for a particular method, the script calls a SDK function (e.g., from an SDK function pool). A representative set of interfaces for this operation was described above in FIG. 11. At step (5), the script combines the SDK function call results with other SDK-collected data, and, at step (6) the mobile SDK 1204 returns the resulting telemetry data back to the edge server. At step (7), the edge server 1200 delivers a JS version identifier (version_id) and the collected sensor data to the back-end 1202. As depicted, and in this embodiment, the back-end bot detection system has a mapping for version_id to SDK function. The back-end runs its validation logic and makes the decision regarding whether to flag the request as human or bot.

Summarizing, the solution provides a mechanism to add or modify signal collection telemetry, making it harder for bad actors to send spoofed telemetry and carry out sensor data replay attacks. In this approach, the native SDK in a customer application initializes a webview. Typically, the native SDK exposes some native signals (typically, device information signals). These native signals may accompany a JS fetch request initiated by the webview. The edge server receives the JS fetch request and determines a set of script telemetry collection signals to be executed at runtime by the webview. Preferably, the edge server also computes a TOID for these signals. In response to the JS fetch request, the edge server returns the script to the webview, which then initiates the runtime collection of the signals that have been identified for collection. The signals data collected by the webview is passed back to the native SDK, which appends the data to any native SDK exposed signals data. The resulting data set is processed by the SDK as desired, with the resulting telemetry then passed back to the edge server (and from there to the back-end as necessary) for bot detection. During validation, the edge back-end may recompute and verify the TOID to facilitate the bot detection. In addition, the script may also control the native SDK sensor data order, e.g., by passing order array information to the native SDK.

Enabling Technologies

The overlay network platform (such as depicted in FIG. 1) comprises a set of distributed technologies that are accessible, e.g., via a customer configuration portal. The customer user, when interacting with the portal, accesses and obtains the native SDK that will be incorporated into the customer application, and specifies an endpoint to be protected by the technique.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a stand-alone machine, or across a distributed set of machines. The functionality may be provided as a service, e.g., as a SaaS solution.

The techniques herein may be implemented in a computing platform. One or more functions of the computing platform may be implemented conveniently in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include Software as a Service (Saas) (the provider's applications running on cloud infrastructure), Platform as a service (PaaS) (the customer deploys applications that may be created using provider tools onto the cloud infrastructure), and Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a stand-alone machine, or across a distributed set of machines.

Although typically the mobile SDK is provided by an overlay network service provider, this is not a limitation. The technique herein may be implemented in any native code library that supports a webview functionality, and there is also no requirement that the SDK/library operate in association with a mobile application and/or an end user mobile device. Further, the dynamic signal-based control provided by the webview-based scripting functionality as described may be used for implementing other client-side features besides data collection to support bot detection.

Each above-described process, module or functionality preferably is implemented in computer software as a set of program instructions executable in one or more processors, as a special-purpose machine.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

The invention claimed is:

1. A method of enabling an application executing on a client-side device to access a protected endpoint executing on a remote node, the remote node comprising an edge server from which the protected endpoint is accessible, the remote node associated with a back-end server that provides a bot detection, the client-side device executing a code library in association with the application, comprising:

within an operating context initiated by the application:

initiating a webview;

issuing a request from the webview to the remote node, the request having associated therewith first data collected by the code library;

in response to the request, receiving from the remote node a script, the script having been generated at the remote node and identifying one or more signals for data collection;

run-time executing the script in the webview and, as a result, collecting second data as specified by the one or more signals;

delivering telemetry to the remote node, the telemetry facilitating the bot detection and including at least the second data; and based at least in part on the telemetry, enabling access to the protected endpoint.

2. The method as described in claim 1, wherein the code library is a Software Development Kit (SDK).

3. The method as described in claim 2, wherein the telemetry also includes sensor data collected by the SDK.

4. The method as described in claim 3, wherein the telemetry is encrypted.

5. The method as described in claim 1, the script having been selected from a set of scripts available from the remote node.

6. The method as described in claim 1, the one or more signals having been selected from a set of signals.

7. The method as described in claim 6, wherein the one or more signals comprise a plurality of signals with an order having been specified for the script.

8. The method as described in claim 1 wherein the first data comprises information about the client-side device.

9. The method as described in claim 1, wherein access to the protected endpoint is based on a determination at the remote node that the client-side device is associated with a human user, wherein the determination is based at least in part on the telemetry.

10. An apparatus, comprising:

one or more hardware processors; and computer memory holding computer program instructions executed by the one or more hardware processors, the computer program instructions configured to provide dynamic control over a data collection mechanism, the data collection mechanism operating on a client-side device running application, the application having an associated code library, the computer program instructions having program code configured to:

receive a request, the request having been issued from a webview running in the client-side device in association with the code library;

in response to the request, identifying a script, and one or more signals for data collection to be evaluated on the client-side device;

return the script to the webview;

receive telemetry from the client-side device, the telemetry facilitating a bot detection and including data having been collected at the client-side device based on runtime execution of the script in the webview; and based at least in part on the telemetry, enabling access to a protected endpoint.

11. The apparatus as described in claim 10, wherein the code library is a Software Development Kit (SDK).

12. The apparatus as described in claim 10, wherein the program code is further configured to select the script from a set of scripts.

13. The apparatus as described in claim 12, wherein the program code is further configured to select the one or more signals from a set of signals.

14. The apparatus as described in claim 13, wherein the one or more signals comprise a plurality of signals with an order, and wherein the program code is further configured to specify the order.

15. The apparatus as described in claim 10, wherein the protected endpoint is associated with an edge server.

16. The apparatus as described in claim 10, wherein access to the protected endpoint is permitted based on a determination that the client-side device is associated with a human user.

17. A method to control data collection, comprising:

configuring an application with a native code library;

initiating a webview;

issuing from the webview a request for a data collection script;

receiving the data collection script in in the webview, the data collection script having associated therewith a set of control signals having an ordering;

runtime-executing the data collection script in the webview to collect data associated with the set of control signals; and outputting the data to facilitate a bot detection;

the identification of the set of control signals and their ordering having been determined on-the-fly in response to the request issued from the webview.

18. The method as described in claim 17, wherein the native code library is a Software Development Kit (SDK).

19. The method as described in claim 17, the data collection script having been selected from a set of data collection scripts in response to the request issued from the webview.

* * * * *